United States Patent
Kardos et al.

(10) Patent No.: US 8,413,627 B2
(45) Date of Patent: Apr. 9, 2013

(54) ARRANGEMENT OF A SUPERCHARGED INTERNAL COMBUSTION ENGINE

(75) Inventors: Zoltan Kardos, Södertälje (SE); Erik Söderberg, Stockholm (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 12/920,495

(22) PCT Filed: Feb. 17, 2009

(86) PCT No.: PCT/SE2009/050166
§ 371 (c)(1),
(2), (4) Date: Sep. 1, 2010

(87) PCT Pub. No.: WO2009/123542
PCT Pub. Date: Oct. 8, 2009

(65) Prior Publication Data
US 2011/0005475 A1  Jan. 13, 2011

(30) Foreign Application Priority Data

Mar. 6, 2008 (SE) .................................. 0800530

(51) Int. Cl.
*B60H 1/03* (2006.01)
*F01P 3/00* (2006.01)
*F02G 5/00* (2006.01)

(52) U.S. Cl.
USPC .............. 123/142.5 E; 123/543; 123/549; 123/563; 123/568.12; 123/41.29

(58) Field of Classification Search .............. 123/41.01, 123/41.13, 41.15, 41.29, 41.31, 142.5 R, 123/142.5 E, 543, 545–547, 556, 563, 568.12; 60/599

See application file for complete search history.

(56) References Cited

U.S. PATENT DOCUMENTS 3,439,657 A * 4/1969 Gratzmuller .................. 123/563
4,236,492 A * 12/1980 Tholen ........................ 123/563
(Continued)

FOREIGN PATENT DOCUMENTS

DE  10325981 A1  12/2004
FR  2914026 A1  9/2008
(Continued)

OTHER PUBLICATIONS

International Search Report dated Jun. 15, 2009, issued in corresponding international application No. PCT/SE2009/050166.

*Primary Examiner* — Noah Kamen
(74) *Attorney, Agent, or Firm* — Ostrolenk Faber LLP

(57) ABSTRACT

An arrangement for a supercharged combustion engine (2), to prevent ice formation in a cooler (10, 15). The arrangement comprises a low-temperature cooling system with a circulating coolant and a cooler (10, 15) in which a gaseous medium which contains water vapour is cooled by the coolant in the cooling system. An electric circuit with an electric warming unit (28, 28a, 28b) is positioned in contact with the coolant in the second cooling system, a voltage source (36, 36a, 36b) and a circuit-breaker (30, 30a, 30b) which can be placed in a first position whereby it disconnects the warming unit (28, 28a, 28b) and the voltage source (36, 36a, 36b) and in a second position whereby it connects together the warming unit (28, 28a, 28b) and the voltage source (36) so that the warming unit (28, 28b, 28b) receives electrical energy and warms the coolant in the cooling system.

13 Claims, 2 Drawing Sheets

U.S. PATENT DOCUMENTS

| | | | |
|---|---|---|---|
| 5,394,854 A * | 3/1995 | Edmaier et al. | 123/563 |
| 5,598,705 A | 2/1997 | Uzkan | |
| 6,230,668 B1 * | 5/2001 | Marsh et al. | 123/41.44 |
| 6,394,076 B1 | 5/2002 | Hudelson | |
| 2007/0261400 A1 | 11/2007 | Digele et al. | |

FOREIGN PATENT DOCUMENTS

| | | |
|---|---|---|
| GB | 1324847 A | 7/1973 |
| WO | WO2007/055644 A1 | 5/2007 |
| WO | WO 2007/108761 A1 | 9/2007 |

* cited by examiner

ARRANGEMENT OF A SUPERCHARGED INTERNAL COMBUSTION ENGINE

CROSS REFERENCE TO RELATED APPLICATION

The present application is a 35 U.S.C. §§371 national phase conversion of PCT/SE2009/050166 filed Feb. 17, 2009, which claims priority of Swedish Application No. 0800530-8, filed Mar. 6, 2008, the disclosure of which is incorporated by reference herein. The International Application was published in the English Language

BACKGROUND TO THE INVENTION, AND STATE OF THE ART

The present invention relates to an arrangement for a supercharged combustion engine whereby a gaseous medium which contains water vapour can be subjected to very good cooling in a cooler while at the same time the risk of the cooler being obstructed is eliminated.

The amount of air which can be supplied to a supercharged combustion engine depends on the pressure of the air but also on the temperature of the air. Supplying the largest possible amount of air to the combustion engine entails effective cooling of the air before it is led to the combustion engine. The air is usually cooled in a charge air cooler arranged at a front portion of a vehicle. At that location the charge air cooler has a cooling air flow at the temperature of the surroundings flowing through it, which makes it possible for the compressed air to be cooled to a temperature close to the temperature of the surroundings. In cold weather conditions, the compressed air may be cooled to a temperature below the dewpoint temperature of the air, resulting in precipitation of water vapour in liquid form in the charge air cooler. When the temperature of the surrounding air is lower than 0° C., there is also risk of the precipitated water freezing to ice within the charge air cooler. Such ice formation will cause a greater or lesser amount of obstruction of the airflow ducts within the charge air cooler, resulting in a reduced flow of air to the combustion engine and consequent operational malfunctions or stoppages.

The technique known as EGR (Exhaust Gas Recirculation) is a known way of recirculating part of the exhaust gases from a combustion process in a combustion engine. The recirculating exhaust gases are mixed with the inlet air to the combustion engine before the mixture is led to the cylinders of the combustion engine. Adding exhaust gases to the air causes a lower combustion temperature, resulting inter alia in a reduced content of nitrogen oxides $NO_x$ in the exhaust gases. This technique is used both for Otto engines and for diesel engines. Supplying a large amount of exhaust gases to the combustion engine entails effective cooling of the exhaust gases before they are led to the combustion engine. The exhaust gases may be subjected to a first step of cooling in an EGR cooler which is cooled by coolant from the combustion engine's cooling system, and a second step of cooling in an air-cooled EGR cooler. The exhaust gases can thus also be cooled to a temperature close to the temperature of the surroundings. Exhaust gases contain water vapour which condenses within the EGR cooler when the exhaust gases undergo the second step of cooling to a temperature which is lower than the dewpoint of the water vapour. When the temperature of the temperature of the surroundings is below 0° C., there is also risk of the condensate formed freezing to ice within the second EGR cooler. Such ice formation will cause a greater or lesser amount of obstruction of the exhaust gas flow ducts within the EGR cooler. When the recirculation of exhaust gases ceases or is considerably reduced, the result is an increased content of nitrogen oxides in the exhaust gases.

SUMMARY OF THE INVENTION

The object of the present invention is to provide an arrangement whereby a gaseous medium which contains water vapour can be subjected to very good cooling in a cooler while at the same time the risk of the cooler being obstructed is eliminated.

This object is achieved with the arrangement of the kind mentioned in the introduction. An arrangement for a supercharged combustion engine, to prevent ice formation in a cooler. The arrangement comprises a low-temperature cooling system with a circulating coolant and a cooler in which a gaseous medium which contains water vapour is cooled by the coolant in the cooling system. An electric circuit with an electric warming unit is positioned in contact with the coolant in the second cooling system, a voltage source and a circuit-breaker which can be placed in a first position whereby it disconnects the warming unit and the voltage source and in a second position whereby it connects together the warming unit and the voltage source so that the warming unit receives electrical energy and warms the coolant in the cooling system. For the gaseous medium to be effectively cooled, it needs to be cooled by a coolant in a cooling system which may be referred to as a low-temperature cooling system. When coolant in a low-temperature cooling system is used, the arrangement is usually cooled to a temperature at which water in liquid form is precipitated within the cooler. If the coolant is also colder than 0° C., there is obvious risk of the water freezing to ice within the cooler. The lower the temperature of the coolant in the low-temperature cooling system, the greater this risk. According to the invention, an electric circuit with an electric warming unit and a circuit-breaker is used to make it possible, when necessary, to warm the coolant in the low-temperature cooling system. During normal operation of the combustion engine, the circuit breaker is placed in a first position whereby the voltage source is disconnected from the electric warming unit. In this position the warming unit does not effect any warming of the coolant in the cooling systems. When the circuit breaker is placed in a second position, electrical energy is led to the warming unit from the voltage source, resulting in the coolant in the cooling system being warmed by the warming unit. Such warming is favourable in situations where the coolant in the low-temperature cooling system is at such a low temperature that it risks cooling the gaseous medium so much that ice will form within the cooler. If a person decides that the cooler risks freezing up or is about to freeze up, the circuit breaker can be placed manually in the second position. When the risk of ice formation ceases, the circuit breaker can be returned to the first position. The gaseous medium can thus be provided with very good cooling in a cooler while at the same time ice formation in the cooler can be avoided.

According to a preferred embodiment of the invention, the arrangement comprises at least one sensor adapted to detecting a parameter which indicates whether the gaseous medium is cooled so much that there is ice formation or risk of ice formation in the cooler, and a control unit adapted to receiving information from said component(s) and to deciding whether there is ice formation or risk of ice formation in the cooler and, if so, to placing the circuit-breaker in the second position. With such a configuration, the circuit breaker can be automatically placed in the second position when there is risk of ice formation in the cooler. The control unit may be a computer unit with suitable software for the purpose. Said sensor may be a temperature sensor which detects the temperature of the coolant in the low-temperature cooling system. If the temperature of the coolant is over 0° C. when it is led into the cooler, there is no risk of ice formation within the cooler. To completely avoid ice formation, the control unit can place the circuit breaker in the second position as soon as the temperature of the coolant drops below 0° C. The arrangement preferably comprises temperature sensors or pressure sensors adapted to detecting a parameter which is related to the gaseous medium's pressure drop or temperature drop in the cooler. One sensor may detect the gaseous medium's pressure or temperature before it is led into the cooler and one sensor may detect the gaseous medium's pressure or temperature when it is led out from the cooler. If the pressure drop or temperature drop in the cooler is not within a predetermined value, the control unit may find that the flow passages in the cooler are about to be obstructed by ice. In such cases the control unit places the circuit breaker in the second position so that the coolant in the low-temperature cooling system is subjected to warming. The warmed coolant which flows through the cooler will melt the ice which has formed within the cooler. When the ice has melted, the control unit receives information from the sensors which indicates that the pressure drop or temperature drop in the cooler has reverted to acceptable values. The control unit returns the circuit breaker to the first position. In this case a limited amount of ice formation is thus allowed within the cooler, but the result is very effective cooling of the gaseous medium when coolant temperatures below 0° C. are acceptable so long as the cooler does not begin to freeze up.

According to another preferred embodiment of the invention, the second cooling system has a radiator element whereby the circulating coolant is cooled by air at the temperature of the surroundings. The coolant can thus be cooled to a temperature close to the temperature of the surroundings. The warming unit is with advantage situated in the low-temperature cooling system at a location downstream of the radiator element. The coolant is at its lowest temperature after it has been cooled in the radiator element, and it is therefore advantageous to warm the coolant at such a location. The warming unit may be situated upstream of the cooler with respect to the intended direction of coolant flow in the second cooling system. The coolant in the low-temperature cooling system can thus be warmed before it is led into the cooler. In situations where the circuit breaker is placed in the second position, relatively warm coolant can thus be led into the cooler so that the ice which has formed within the cooler will quickly melt away. The warming unit may alternatively be situated within the cooler, in which case the warming unit will with advantage be situated close to an inlet for the coolant in the cooler.

According to another preferred embodiment of the invention, the arrangement comprises a further cooler whereby the gaseous medium is intended to be subjected to a first step of cooling by the coolant in a high-temperature cooling system before the gaseous medium is led to the aforesaid cooler, in which it undergoes a second step of cooling by the coolant in the low-temperature cooling system. The gaseous medium may be the compressed air which is led into an inlet line to the combustion engine. When air is compressed, it undergoes an amount of heating which is related to the degree of compression of the air. In supercharged combustion engines, air is used at a very high pressure. The air therefore requires effective cooling. Accordingly, it is advantageous to cool the compressed air in more than one cooler and in two or more stages so that it can reach a desired low temperature before it is led to the combustion engine. Said gaseous medium may also be recirculating exhaust gases which are led in a return line to the combustion engine. The exhaust gases may be at a temperature of 500-600° C. when they are led into the return line. It is therefore also advantageous to cool the exhaust gases in more than one cooler and in two or more stages so that they can reach a desired low temperature before they are led to the combustion engine. The cooling system which cools a combustion engine is at a temperature of 80-100° C. during normal operation. This cooling system may therefore be referred to as a high-temperature cooling system. It is therefore very advantageous to use this existing cooling system for subjecting the gaseous medium to a first step of cooling.

BRIEF DESCRIPTION OF THE DRAWINGS

Preferred embodiments of the invention are described below by way of examples with reference to the attached drawing, in which.

DETAILED DESCRIPTION OF PREFERRED EMBODIMENTS OF THE INVENTION

Figure 1:
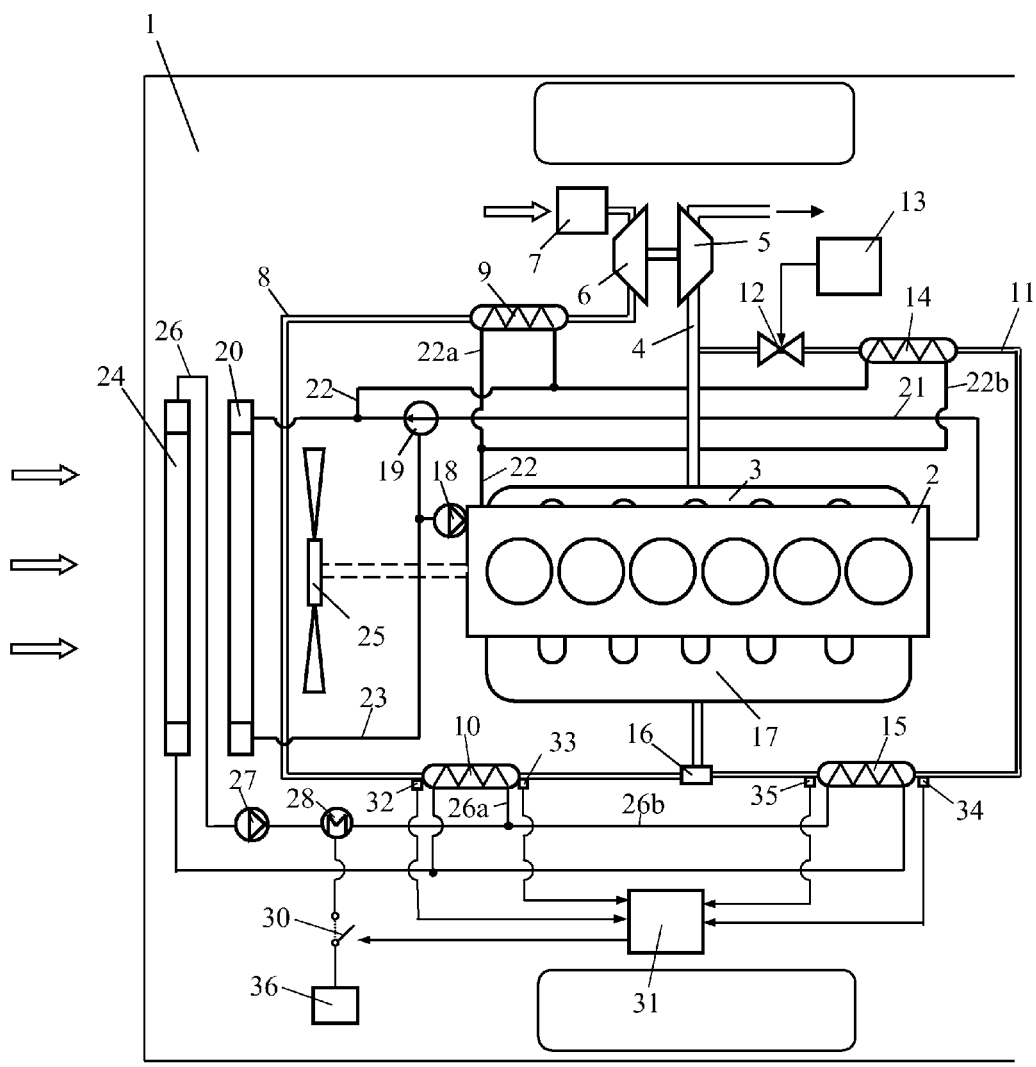
FIG. 1 depicts an arrangement for a supercharged combustion engine according to a first embodiment of the invention and FIG. 2 depicts an arrangement for a supercharged combustion engine according to a second embodiment of the invention.

FIG. 1 depicts an arrangement for a supercharged combustion engine which is intended to power a schematically depicted vehicle 1. The combustion engine is here exemplified as a diesel engine 2. The diesel engine 2 may be intended to power a heavy vehicle 1. The exhaust gases from the cylinders of the diesel engine 2 are led via an exhaust manifold 3 to an exhaust line 4. The diesel engine 2 is provided with a turbo unit which comprises a turbine 5 and a compressor 6. The exhaust gases in the exhaust line 4, which are at above atmospheric pressure, are led initially to the turbine 5. The turbine 5 is thus provided with driving power which is transferred, via a connection, to the compressor 6. The compressor 6 uses this power to compress air which is drawn into an air inlet line 8 via an air filter 7. The air in the inlet line is cooled initially in a first coolant-cooled charge air cooler 9. The air is cooled in the first charge air cooler 9 by coolant from the combustion engine's cooling system. The compressed air is thereafter cooled in a second coolant-cooled charge air cooler 10. The air is cooled in the second charge air cooler 10 by coolant from a separate cooling system.

The arrangement comprises a return line 11 for effecting recirculation of part of the exhaust gases in the exhaust line 4. The return line has an extent between the exhaust line 4 and the inlet line 8. The return line 11 comprises an EGR valve 12 by which the exhaust flow in the return line 11 can be shut off. The EGR valve 12 can also be used for steplessly controlling the amount of exhaust gases which is led from the exhaust line 4 to the inlet line 8 via the return line 11. A control unit 13 is adapted to controlling the EGR valve 12 on the basis of information about the current operating state of the diesel engine 2. The return line 11 comprises a first coolant-cooled EGR cooler 14 for subjecting the exhaust gases to a first step of cooling. The exhaust gases are cooled in the first EGR cooler 14 by coolant from the combustion engine's cooling system. The exhaust gases are subjected to a second step of cooling in a coolant-cooled EGR cooler 15. The exhaust gases are cooled in the second EGR cooler 15 by coolant from the separate cooling system.

In certain operating situations in supercharged diesel engines 2, the pressure of the exhaust gases in the exhaust line 4 will be lower than the pressure of the compressed air in the inlet line 8. In such operating situations it is not possible to mix the exhaust gases in the return line 11 directly with the compressed air in the inlet line 8 without special auxiliary means. To this end it is possible to use, for example, a venturi 16 or a turbo unit with variable geometry. If instead the combustion engine 2 is a supercharged Otto engine, the exhaust gases in the return line 11 can be led directly into the inlet line 8, since the exhaust gases in the exhaust line 4 of an Otto engine in substantially all operating situations will be at a higher pressure than the compressed air in the inlet line 8. When the exhaust gases have mixed with the compressed air in the inlet line 8, the mixture is led to the respective cylinders of the diesel engine 2 via a manifold 17.

The combustion engine 2 is cooled in a conventional manner by a cooling system which contains a circulating coolant. The coolant is circulated in the cooling system by a coolant pump 18. A main flow of the coolant is circulated through the combustion engine 2. After the coolant has cooled the combustion engine 2, it is led in a line 21 to a thermostat 19 in the cooling system. When the coolant has reached a normal operating temperature, the thermostat 19 is adapted to leading it to a radiator 20 fitted at a forward portion of the vehicle, in order to be cooled. A smaller portion of the coolant in the cooling system is nevertheless not led back to the combustion engine 2 but is circulated through a line 22 which divides into two parallel lines 22a, 22b. The line 22a leads coolant to the first charge air cooler 9 in which it subjects the compressed air to a first step of cooling. The line 22b leads coolant to the first EGR cooler 14 in which it subjects the recirculating exhaust gases to a first step of cooling. The coolant which has cooled the air in the first charge air cooler 9 and the coolant which has cooled the exhaust gases in the first EGR cooler 14 are reunited in the line 22, which leads the coolant back to the line 21. The warmed coolant is led in the line 21 to the radiator 20.

The separate cooling system comprises a radiator element 24 fitted in front of the radiator 20 in a peripheral region of the vehicle 1. In this case the peripheral region is situated at a front portion of the vehicle 1. A radiator fan 25 is adapted to generating an air stream of surrounding air through the radiator element 24 and the radiator 20. As the radiator element 24 is situated in front of the radiator 20, the coolant is cooled in the radiator element 24 by air at the temperature of the surroundings. The coolant in the radiator element 24 can thus be cooled to a temperature close to the temperature of the surroundings. The cold coolant from the radiator element 24 is circulated in the separate cooling system in a line 26 by a pump 27. A warming unit 28 is arranged in the line 26. If need be, the cold coolant in the separate cooling system may be warmed by the warming unit 28. The warming unit 28 is comprised in an electric circuit. The electric circuit also comprises a circuit breaker 30 which can be placed in a closed position and an open position by a control unit 31. When the circuit breaker 30 is in the closed position, the warming unit 28 is connected to a voltage source 36 so that it receives electrical energy and warms the coolant in the separate cooling system.

After the coolant in the separate cooling system has passed through the warming unit 28, the line 26 divides into two parallel lines 26a, 26b. The line 26a leads coolant to the second charge air cooler 10 in which it subjects the compressed air to a second step of cooling. The line 26b leads coolant to the second EGR cooler 15 in which it subjects the recirculating exhaust gases to a second step of cooling. After the coolant has passed through the second charge air cooler 10 and the second EGR cooler 15, the lines 26a, 26b join together. The coolant is thereafter led in the line 26 to the radiator element 24 in order to be cooled. A first pressure sensor 32 is arranged in the air line 8 to detect the pressure of the air before it is led into the second charge air cooler 10. A second pressure sensor 33 is arranged in the air line 8 to detect the pressure of the air after it has passed through the second charge air cooler 10. A third pressure sensor 34 is arranged in the return line 11 to detect the pressure of the exhaust gases before they are led into the second EGR cooler 15. A fourth pressure sensor 35 is arranged in the return line 11 to detect the pressure of the exhaust gases after they have passed through the second EGR cooler 15. The control unit 31 is adapted to receiving from said sensors information concerning measured pressures.

During operation of the diesel engine 2, exhaust gases flow through the exhaust line 4 and drive the turbine 5. The turbine 5 is thus provided with driving power which drives the compressor 6. The compressor 6 draws surrounding air in via the air filter 7 and compresses the air in the inlet line 8. The air thus acquires an increased pressure and an increased temperature. The compressed air is cooled in the first charge air cooler 9 by the radiator liquid in the combustion engine's cooling system. The radiator liquid may here be at a temperature of about 80-85° C. Thus the compressed air can undergo in the first charge air cooler 9 a first step of cooling to a temperature close to the temperature of the coolant. The compressed air is thereafter led through the second charge air cooler 10, in which it is cooled by the coolant in the separate cooling system. The coolant may here be at a temperature close to the temperature of the surroundings. Thus the compressed air can in favourable circumstances be cooled to a temperature close to the temperature of the surroundings.

In most operating states of the diesel engine 2, the control unit 13 will keep the EGR valve 12 open so that part of the exhaust gases in the exhaust line 4 is led into the return line 11. The exhaust gases in the exhaust line 4 may be at a temperature of about 500-600° C. when they reach the first EGR cooler 14. The recirculating exhaust gases undergo in the first EGR cooler 14 a first step of cooling by the coolant in the combustion engine's cooling system. The coolant in the combustion engine's cooling system will thus be at a relatively high temperature but definitely lower than the temperature of the exhaust gases. It is thus possible to effect good cooling of the exhaust gases in the first EGR cooler 14. The recirculating exhaust gases are thereafter led to the second EGR cooler 15, in which they are cooled by the coolant in the separate cooling system. The coolant will here be at a definitely lower temperature and the exhaust gases can in favourable circumstances be cooled to a temperature close to the temperature of the surroundings. Exhaust gases in the return line 11 can thus undergo cooling to substantially the same low temperature as the compressed air before they mix and are led to the combustion engine 2. A substantially optimum amount of air and recirculating exhaust gases can therefore be led into the combustion engine. Combustion in the combustion engine 2 with substantially optimum performance is thus made possible. The low temperature of the compressed air and the recirculating exhaust gases also results in a lower combustion temperature and hence a lower content of nitrogen oxides in the exhaust gases.

This effective cooling of the compressed air and the recirculating exhaust gases also has disadvantages. The compressed air is cooled in the second charge air cooler 10 to a temperature at which water in liquid form precipitates within the charge air cooler 10. Similarly, the exhaust gases in the second EGR cooler 15 are cooled to a temperature at which condensate forms within the second EGR cooler 15. When the temperature of the surrounding air is lower than 0° C., there is also risk of the precipitated water freezing to ice within the second charge air cooler 10 and of the precipitated condensate freezing to ice within the second EGR cooler 15. Ice formation within the second charge air cooler 10 and the second EGR cooler 15 might seriously disturb the operation of the combustion engine 2. To prevent the second charge air cooler 10 and the second EGR cooler 15 from freezing up, the control unit 31 substantially continuously receives information from the pressure sensors 32, 33 concerning the pressure of the air before and after the second charge air cooler 10 and from the pressure sensors 34, 35 concerning the pressure of the recirculating exhaust gases before and after the second EGR cooler 15. If the pressure sensors 32, 33 indicate a pressure drop which exceeds a predetermined threshold value in the second charge air cooler 10, the control unit 31 may find that ice has formed within the charge air cooler 10. If the pressure sensors 34, 35 indicate a pressure drop which exceeds a predetermined threshold value in the second EGR cooler 15, it may similarly be found that ice has formed in the second EGR cooler 15.

If the control unit 31 receives such information, the circuit breaker 30 is placed in a closed position so that the warming unit 28 receives electrical energy from the voltage source 36. The warming unit 28 therefore warms the cold coolant flowing past in the separate cooling system. The warming unit 28 is situated in the separate cooling system at a location downstream of the radiator element 24 and upstream of the second charge air cooler 10 and the second EGR cooler 15 with respect to the intended direction of coolant flow in the separate cooling system. The coolant in the separate system is thus provided with a marked warming before it is led to the second charge air cooler 10 and to the second EGR cooler 15. When the warm coolant is led through the second charge air cooler 10 and the second EGR cooler 15, it will quickly and effectively melt the ice which has formed in the coolers 10, 15.

As soon as the control unit 31 receives information which indicates that the pressure drop in the second charge air cooler 10 and in the second EGR cooler 15 has reverted to acceptable values, the control unit 31 opens the circuit-breaker 30 so that the connection between the warming unit 28 and the voltage source 36 is broken, thereby halting the supply of electrical energy to the warming unit 28. The warming of the coolant in the separate cooling system ceases and cold coolant which has been cooled in the radiator element 24 can be reused for cooling the air in the second charge air cooler 10 and the exhaust gases in the second EGR cooler 15. If a very low ambient temperature occurs during operation of the vehicle, the control unit 31 may at regular intervals place the circuit breaker 30 in a closed position to prevent too much ice formation in the second charge air cooler 10 and in the second EGR cooler 15. The arrangement thus makes possible very effective cooling of the air in the second charge air cooler 10 and the exhaust gases in the second EGR cooler 15. At the same time, there is prevention in the second charge air cooler 10 and in the second EGR cooler 15 of ice formation which might disturb the operation of the combustion engine 2. Even during cold starts of a vehicle 1, it is possible to place the circuit breaker 30 directly in a closed position in order to prevent ice formation in the second charge air cooler 10 and in the second EGR cooler 15.

Figure 2:
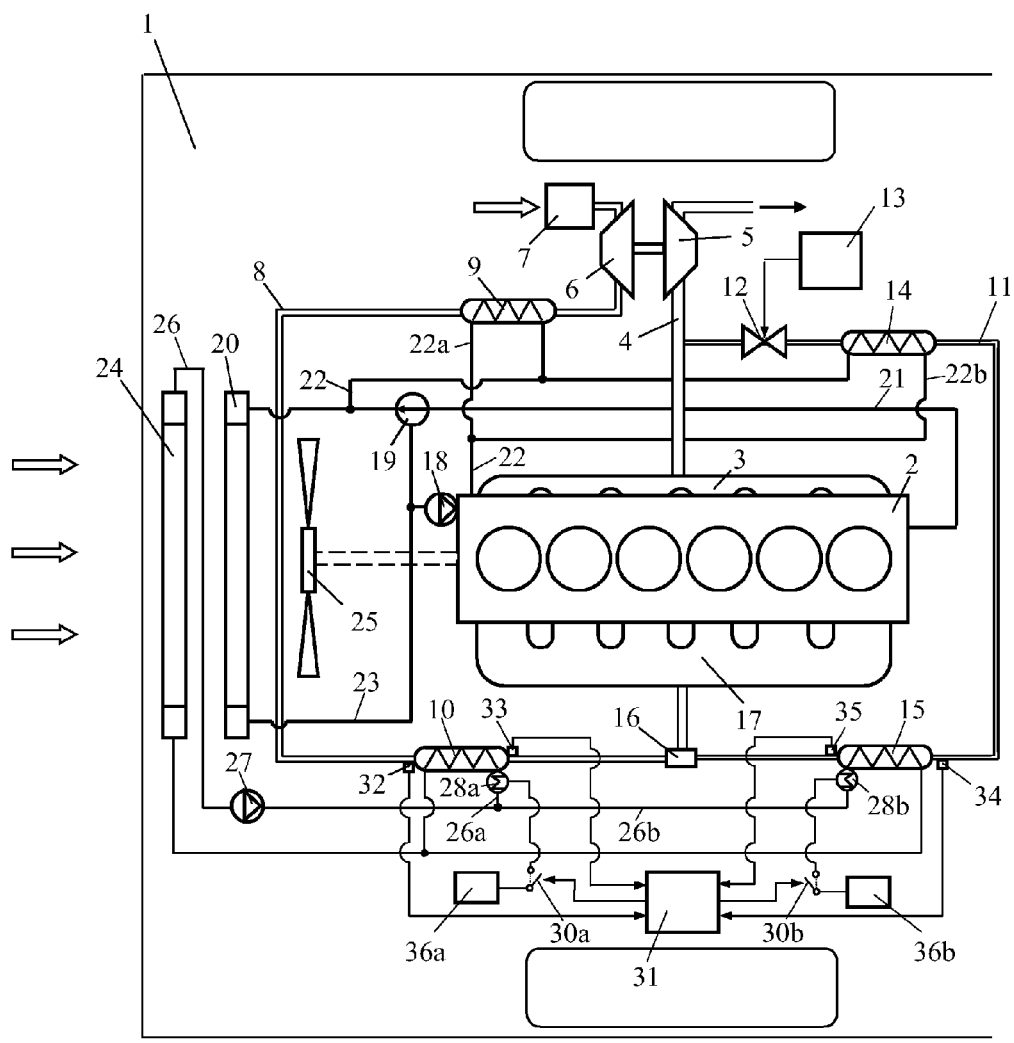

FIG. 2 depicts an embodiment in which a separate warming unit 28a is used, when necessary, to warm the coolant which is led to the second charge air cooler 10. The warming unit 28a is here arranged in the line 26a which leads coolant to the second charge air cooler 10. Here again, an electrical circuit with a circuit-breaker 30a and a voltage source 36a is used. The coolant which is led to the second charge air cooler 10 can thus easily be warmed. A second warming unit 28b is used to warm the coolant which is led to the second EGR cooler 15. The second warming unit 28b is arranged in the line 26b which leads coolant to the second EGR cooler 15. Here again, an electrical circuit with a circuit-breaker 30b and a voltage source 36b is used. The coolant which is led to the second EGR cooler 15 can likewise thus easily be warmed. The two warming units 28a, 28b make possible a separate warming of the coolant which is led to the second charge air cooler 10 and to the second EGR cooler 15. The warming units 28a, 28b can thus be activated independently of one another when there is risk of ice formation in one of the respective coolers 10, 15. The warming units 28a, 28b are here arranged on the outside of the respective coolers 10, 15, close to the coolant inlet in the coolers 10, 15. The warming units 28a, 28b may alternatively be arranged on the inside of the respective coolers 10, 15, close to the coolant inlet in the coolers 10, 15.

The invention is in no way limited to the embodiment depicted in the drawing but may be varied freely within the scopes of the claims. In the embodiment example, pressure sensors are used to determine the pressure drop across the coolers as a parameter for indicating when ice has formed in the coolers. Temperature sensors may equally well be used for determining the temperature drop in the coolers as a parameter for indicating when ice has formed in the coolers. According to another alternative, a temperature sensor may be used to detect the temperature of the coolant which is led to the coolers 10, 15. If the temperature of the coolant is over 0° C., no ice formation can occur in the coolers 10, 15. In the embodiment depicted, the arrangement is used to keep both the second charge air cooler 10 and the second EGR cooler 15 substantially free from ice. The arrangement may also be used for keeping only one of said coolers 10, 15 substantially free from ice. The arrangement is intended for a supercharged combustion engine in which a turbo unit is used for compressing the air which is led to the combustion engine. The arrangement may of course also be used for supercharged combustion engines in which the air is compressed by more than one turbo unit. In such cases the first charge air cooler 9 may be used as an intermediate cooler for cooling the air between the compressions in the compressors of the turbo units.

The invention claimed is:

1. An arrangement for controlling a gaseous medium which contains water vapour in a supercharged combustion engine, the arrangement comprising:
   a path for the gaseous medium leading to the engine, a low-temperature cooling system configured for circulating a circulating coolant, a first cooler at the low temperature cooling system for being cooled by it, and the first cooler is at the path of the gaseous medium, such that the gaseous medium is cooled by the coolant in the low temperature cooling system via the first cooler,
   a high temperature cooling system, a second cooler at the high temperature cooling system for being cooled by it, the second cooler is located at the path of the gaseous medium so that the gaseous medium in the path is subjected to a first step of cooling by the second cooler at the high-temperature cooling system before the gaseous medium is led along the path to the first cooler at which the gaseous medium is subjected to a second step of cooling by the coolant in the low-temperature cooling system;
   an electric circuit with an electric warming unit which is positioned and configured to warm the coolant in the low temperature cooling system, a voltage source in circuit with the warming unit and also with a circuit-breaker such that when the circuit breaker is in a first position, it disconnects the warming unit and the voltage source and when the circuit breaker is in a second position, it connects the warming unit and the voltage source so that the warming unit receives electrical energy from the source and warms the coolant in the low temperature cooling system;

at least one sensor configured and located to detect a parameter which indicates whether the gaseous medium in the path is cooled to such an extent that there is ice formation or risk of ice formation in the first cooler; and a control unit configured to receive information from the at least one sensor and to decide whether there is ice formation or risk of ice formation in the first cooler and, if the control unit decides there is ice formation or risk thereof in the first cooler, the control unit placing the circuit-breaker in the second position.

2. An arrangement according to claim 1, further comprising a pressure sensor or a temperature sensor configured and located to detect a parameter which is related to a pressure drop or a temperature drop in the gaseous medium in the path and at the first cooler.

3. An arrangement according to claim 1, wherein the low-temperature cooling system comprises a radiator element configured such that the circulating coolant is cooled by air at the temperature of the surroundings.

4. An arrangement according to claim 1, wherein the warming unit is situated at the low-temperature cooling system at a location downstream of the radiator element in the circulation of the coolant.

5. An arrangement according to claim 4, wherein the warming unit is situated at the low-temperature cooling system at a location upstream of the first cooler with respect to the intended direction of coolant flow in the cooling system.

6. An arrangement according to claim 4, wherein the warming unit is situated within the first cooler.

7. An arrangement according to claim 1, wherein the gaseous medium is compressed air which is led in an inlet line along the path to the combustion engine.

8. An arrangement according to claim 7, wherein the gaseous medium is recirculating exhaust gases which are led along the path and the path for the exhaust gases is a return line to the combustion engine.

9. An arrangement according to claim 1, wherein the gaseous medium comprises recirculating exhaust gases which are led along the path, and the path for the exhaust gases is a return line to the combustion engine.

10. An arrangement according to claim 9, further comprising a respective one of the first coolers in the first and the second paths and a respective one of the second coolers in the first and second paths, with each second cooler preceding the respective first cooler along each of the first and second paths.

11. An arrangement in a supercharged combustion engine for controlling a gaseous medium which contains water vapour, the arrangement comprising:

an air inlet line configured for leading inlet air along a first path to the combustion engine, wherein the inlet air is heated in the first path;

a low temperature cooling system configured for circulating a circulating coolant there-through, a first cooler at the low temperature cooling system for being cooled by the low temperature cooling system, the first cooler being at the first path of the inlet air, such that the inlet air in the first path is cooled by the coolant in the low temperature cooling system via the first cooler;

a second path for an engine exhaust gases line, the second path comprised of an exhaust line from the engine connected for receiving heated exhaust gases from the engine and a return line communicating with the exhaust gases line, wherein the second path is configured for receiving at least some of the exhaust gases and is configured for returning the exhaust gases to the combustion engine along with the inlet air from the first path;

a high temperature cooling system, a second cooler at the high temperature cooling system for being cooled by the high temperature cooling system, the second cooler being at the return line for cooling the exhaust gases in the return line before the exhaust gases are led along the second path to meet the inlet air in the first path;

an electric circuit with an electric warming unit which is positioned and configured to warm the coolant in the low temperature cooling system, a voltage source in circuit with the warming unit and also with a circuit-breaker which when the circuit breaker is placed in a first position, it disconnects the warming unit and the voltage source and when the circuit breaker is placed in a second position, it connects the warming unit and the voltage source so that the warming unit receives electrical energy from the source and warms the coolant in the low temperature cooling system;

at least one sensor configured and located to detect a parameter which indicates whether the gaseous medium is cooled to such an extent that there is ice formation or risk of ice formation in the first cooler; and a control unit configured to receive information from the at least one sensor and to decide whether there is ice formation or risk of ice formation in the first cooler and, if the control unit decides there is ice formation or risk thereof in the first cooler, the control unit placing the circuit-breaker in the second position.

12. An arrangement according to claim 11, wherein the first cooler is in the low temperature cooling system and the second cooler is in the high temperature cooling system.

13. An arrangement according to claim 11, further comprising an air compressor at the first path for compressing the inlet air in the first path thereby also for raising the temperature of the air which is to be cooled by the first cooler.

* * * * *

UNITED STATES PATENT AND TRADEMARK OFFICE
CERTIFICATE OF CORRECTION

PATENT NO. : 8,413,627 B2  Page 1 of 1
APPLICATION NO. : 12/920495
DATED : April 9, 2013
INVENTOR(S) : Kardos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 442 days.

Signed and Sealed this

First Day of September, 2015

Michelle K. Lee
*Director of the United States Patent and Trademark Office*